United States Patent [19]

Valdman et al.

[11] Patent Number: 5,423,477
[45] Date of Patent: Jun. 13, 1995

[54] PIZZA BOX

[75] Inventors: Michael Valdman, Philadelphia, Pa.; Michael Schum, Cherry Hill, N.J.

[73] Assignee: Invention Machine Corporation, Boston, Mass.

[21] Appl. No.: 82,410

[22] Filed: Jun. 24, 1993

Related U.S. Application Data

[63] Continuation-in-part of Ser. No. 860,177, Mar. 30, 1992, abandoned.

[51] Int. Cl.$^6$ .................. B65D 1/34; B65D 43/03; B65D 43/06
[52] U.S. Cl. .................... 229/104; 206/551; 229/120.011; 229/125.26; 229/906; 229/406
[58] Field of Search ............ 229/125.26, 2.5 R, 902, 229/903, 906, 104, 120, 122, 120.011, 120.012; 206/508, 509, 515, 518, 551; 220/352, 356, 606, 608; 426/107, 113, 114, 115, 122

[56] References Cited

U.S. PATENT DOCUMENTS

| | | | |
|---|---|---|---|
| 1,945,397 | 1/1934 | Gray | 229/906 |
| 2,041,537 | 5/1936 | Frost | 229/125.26 |
| 2,350,950 | 6/1944 | Wiley | 220/356 |
| 3,335,846 | 8/1967 | Mills | 426/122 |
| 3,721,803 | 3/1973 | Distefano | 426/113 |
| 3,931,890 | 1/1976 | Davis | 206/508 |
| 3,938,726 | 2/1976 | Holden, Jr. et al. | 229/2.5 R |
| 4,058,214 | 11/1977 | Mancuso | 426/113 |
| 4,121,510 | 10/1978 | Frederick | 426/113 |
| 4,127,189 | 11/1978 | Shumrack et al. | 229/2.5 R |
| 4,237,171 | 12/1980 | Laage et al. | 229/120 |
| 4,253,600 | 3/1981 | Schubert | 229/2.5 R |
| 4,260,060 | 4/1981 | Faller | 229/903 |
| 4,373,636 | 2/1983 | Hoffman | 229/2.5 R |
| 4,441,626 | 4/1984 | Hall | 229/902 |
| 4,592,914 | 6/1986 | Kuchenbecker | 229/DIG. 14 |
| 4,717,069 | 1/1988 | Pizzolato | 229/902 |
| 4,747,510 | 5/1988 | Mack | 206/508 |
| 4,785,160 | 11/1988 | Hart | 426/113 |
| 4,883,195 | 11/1989 | Ott et al. | 229/2.5 R |
| 5,052,559 | 10/1991 | Bressia, Jr. | 229/906 |
| 5,098,013 | 3/1992 | France et al. | 229/906 |

FOREIGN PATENT DOCUMENTS

| | | | |
|---|---|---|---|
| 660209 | 3/1965 | Belgium | 220/352 |
| 104915 | 3/1917 | United Kingdom | 220/352 |

OTHER PUBLICATIONS

"The Wiley Encyclopedia of Packaging Technology", John Wiley & Sons, 1986, p. 505.

Primary Examiner—Gary E. Elkins
Attorney, Agent, or Firm—Edward Dreyfus

[57] ABSTRACT

A pizza box having a top and bottom each formed of a single layer of biodegradable, insulating material, such as molded fiber. The bottom provides an insulating airspace between the hot pizza product and the bottom major surface area and another insulating airspace between the bottom undersurface and a resting surface. The top and bottom, when closed, provided a closed chamber with no external air circulation. Thermal conduction paths are reduced by the small surface area contact between the bottom and the product and the small surface contact area between the bottom and a resting surface. Additional features include a closed storage chamber without air vents, a truncated cone or truncated pyramid shape, moisture absorption by the top inner surface, liquid resistance by the bottom top surface, stackable tops and bottoms, air restricting closure walls, cutting channels which also add strength to the bottom and radiation reflective color.

52 Claims, 9 Drawing Sheets

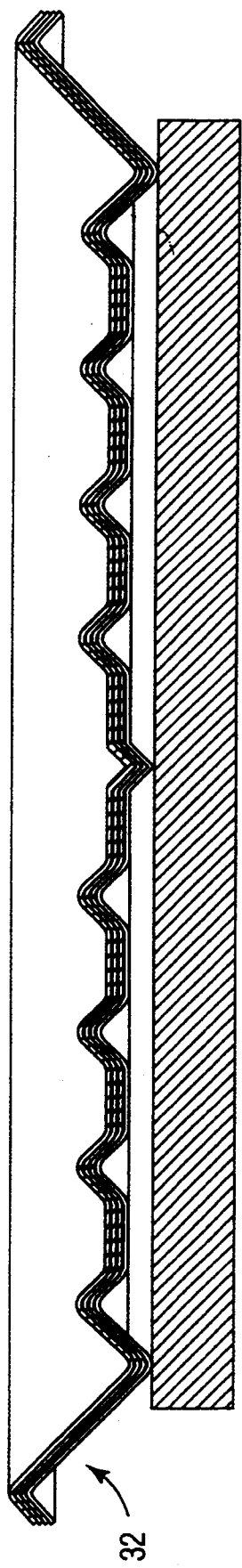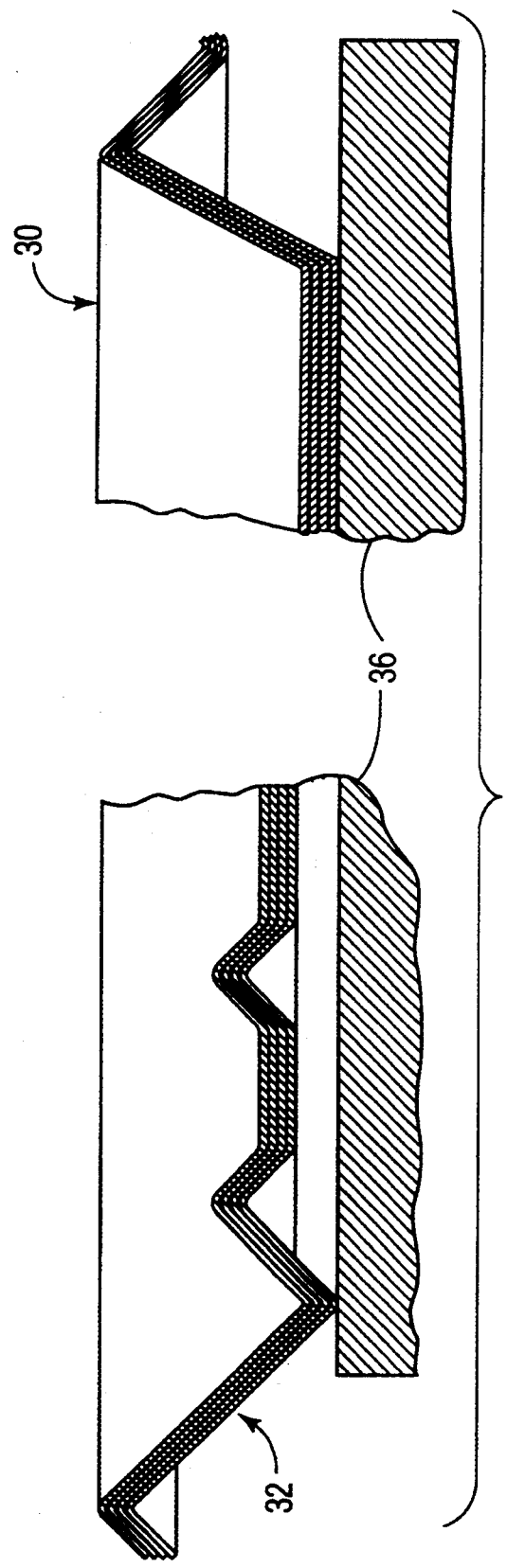
FIG. 10
FIG. 11

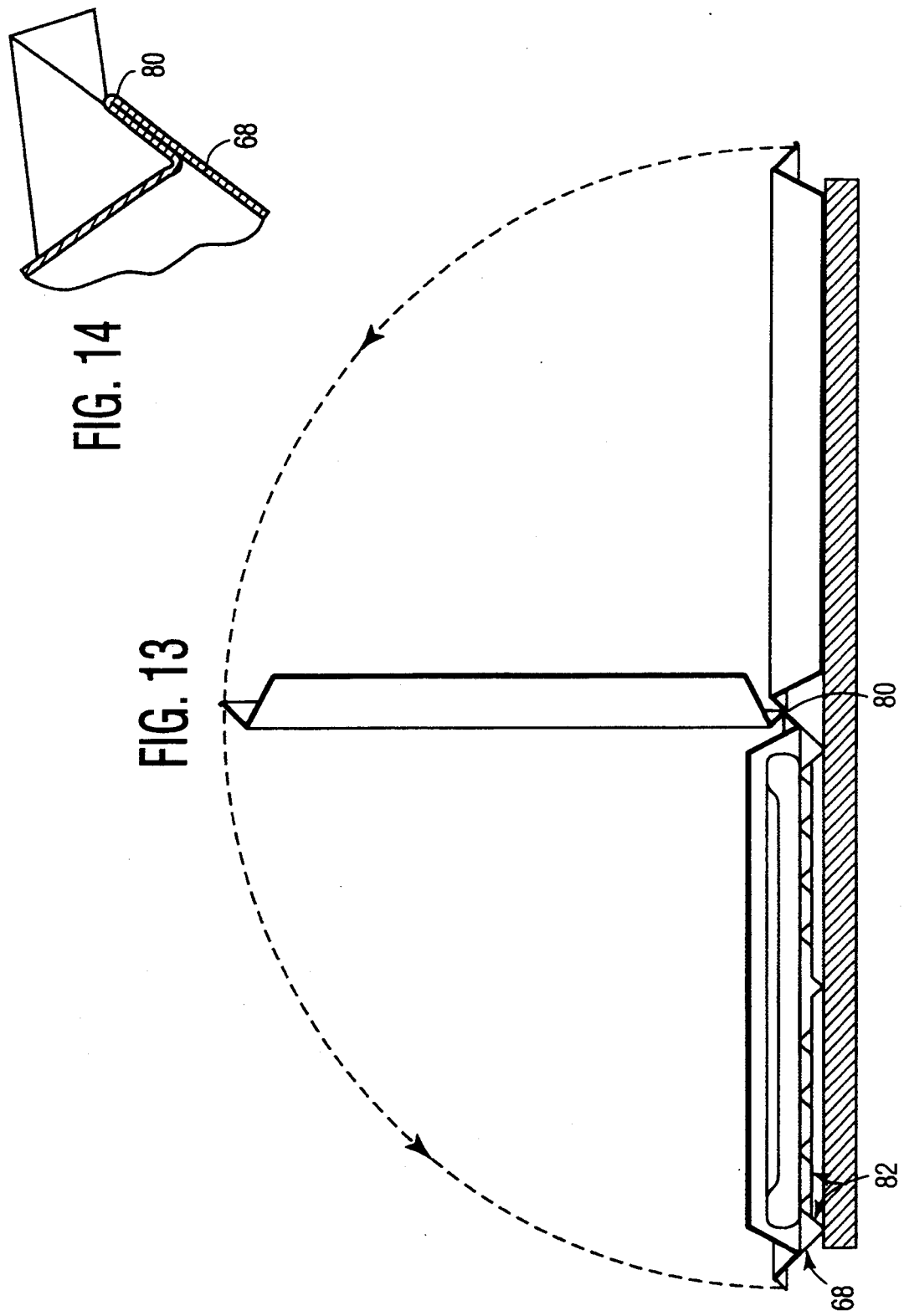

PIZZA BOX

RELATED PATENT APPLICATION

This is a continuation-in-part application of U.S. patent application Ser. No. 07/860,177, filed Mar. 30, 1992, now abandoned.

FIELD OF INVENTION

The present invention relates to pizza boxes and more particularly to boxes for storing and transporting a hot pizza product.

BACKGROUND OF INVENTION

The engineering objective of a pizza box is to deliver a hot, dry and crispy pizza product during a transportation time of up to 45 minutes with a very low per unit box cost. Additional objectives include using the minimum of recycled materials and, because of the "one time use" lifetime thereof, to be made of the biodegradable material. Although the pizza pie delivery industry is large (about 1 Billion boxes delivered in the United States in 1992) and great efforts have been directed to pizza box design and development, the best boxes on the market permit product quality deterioration in about fifteen minutes from enclosing the hot pizza product.

Attempts to maintain the product in a hot condition include using leather outer insulating covers, in-car heaters, and other devices. These techniques tend to maintain temperature for several additional minutes but contribute to quality deterioration due to containment of moisture within the pizza box. But these techniques do not solve the main causes of the problem created by the conventional box design and they certainly add to the cost of the delivery system, the manner of delivery, and the labor related thereto.

It is known in the art that product heat loss through the box and moisture re-absorption by or drippings on the crust within the box are factors contributing to quality deterioration. One attempted solution includes making the box walls thicker or of multilayered or corrugated construction (see Hall U.S. Pat. No. 4,441,626), but these techniques add to costs and materials. The Hoffman U.S. Pat. No. 4,373,636 and the Holden, Jr. et al U.S. Pat. No. 3,938,726 disclose a partially insulating bottom but the supporting surfaces for the product allow much heat loss by thermal conduction. The Pizzalato U.S. Pat. No. 4,717,069, Kuchenbecker U.S. Pat. No. 4,592,914, Stern U.S. Pat. No. 4,360,118, Bressi U.S. Pat. No. 5,052,559, and the Ott et al U.S. Pat. No. 4,883,195 show several other approaches but they, too, enable much heat loss through the bottom of the box or disclose vents and foam plastics or other materials unfriendly to the environment or have added material layers or inserts. Lange et al U.S. Pat. No. 4,237,171 shows a vented box plus a multilayered construction, Mancuso U.S. Pat. No. 4,058,214 and Mills U.S. Pat. No. 3,335,846 show a vented box with a flat bottom base having a large surface area contact with a resting surface.

Other approaches include adding plastic inserts or spacers, wax paper, or other devices to try to obtain incremental benefits. See Volk U.S. Pat. No. 4,886,179 and Armeno et al U.S. Pat. No. 4,605,579. But all these types of techniques add to unit cost which are very important because of the enormous number of units delivered per year. Because all pizza boxes are used once and discarded, effects on the environment and the amount and nature of the materials used are important factors.

Today, virtually all pizza boxes on the market are square-shaped, or essentially square with four corners angled to form an augmented four-sided box, with flat tops and bottoms. See Seaman U.S. Pat. No. 4,979,667, Stease et al U.S. Pat. No. 4,993,625 and Zion U.S. Pat. No. 4,984,734, and Deiger U.S. Pat. No. 4,919,326.

The typical box today is manufactured in blank form so that it can be stacked in bundles for shipment. These blanks are stored at the respective pizza shop away from the oven location until the day of use. Personnel must fold these blanks into individual boxes and stack the completed box near the oven location.

Because of the volume of business, the box design creates serious labor and operational problems. First, time and labor are required to fold the boxes for storage near the oven location. Because the stored boxes are assembled, they require much space (1.25–1.5 inches in height, each) near the oven location. Further, when taken for use, time and labor is required to orient and open the box to permit insertion of the hot pizza product into the box bottom. Further time is required to close the box top and in some cases punch or fold vent tabs or interlocking tabs between top and bottom.

Attempts at labor saving construction include Doboze U.S. Pat. No. 4,848,543 which is made of thick ($\frac{1}{4}$") foam plastic, has a rectangular shape, and requires locking tabs of different material.

SUMMARY OF INVENTION

It is an object of the present invention to provide a new and improved pizza box that preserves the hot pizza quality for about 45 minutes, without the need for special devices such as inserts or warmers, for the same or less unit costs, the same or less material with greater function as compared with prior art pizza boxes and the design or which enables the use of material that is biodegradable and recyclable.

Further objects of the present invention are to provide a pizza box having a top and bottom that require no manual labor to pre-form into a box before the hot pizza product is laid into the bottom, that can be stacked ready for use in the smallest possible space near the oven location, that requires no orientation or essentially no orientation nor interlocking tabs between top and bottom thus providing ease of placing the top on to the bottom to form the completed box.

In keeping with these objects and with other that will become apparent hereinafter, one aspect of the invention resides, briefly stated, in a pizza box in which the floor of the bottom has a plurality of upwardly extending projections to support the hot pizza product on their tips or top surfaces. Such a design substantially reduces the heat losses from the pizza product through the bottom of the box because the surface contact is minimized thus minimizing the total thermal conduction path. In addition, the bottom has a peripheral portion that extends below the product supporting bottom floor to form a dead air space or air gap when the bottom is supported above a resting surface. This dead air gap provides a further insulating layer to minimize thermal conduction.

Another aspect of the invention provides a pizza box bottom having three layers of thermal insulation formed by a bottom base section having a single layer of material, thus preventing heat loss with a minimum in material used and related costs. This is achieved by the single layer of base section material shaped to provide an insulating air-space between the hot pizza product bottom and the upper surface of the product supporting bottom floor and to enclose an insulating air-space beneath the bottom floor and a resting or supporting surface for the pizza box. The third insulating layer is the base section material itself. Thus, a deadspace air-material-deadspace air thermal insulation combination is provided.

Another aspect of the invention is to provide a pizza box that comprises a top and a bottom which when assembled forms a closed air-entrapping chamber about the hot pizza product so that essentially no air circulation occurs therein or therethrough. Pizza quality can be further preserved by providing liquid absorption means or coating on the inner surface of the top or using liquid absorption material for the top itself to absorb moisture vapors released from the hot pizza product. In a preferred embodiment, the inner surface of the bottom can be made liquid resistant so that liquid condensation and drippings from the elevated pizza product remain and do not become absorbed by and transfer their full heat content to the bottom material or wet the bottom to form heat conducting liquid channels through the bottom material. Also, because the bottom is naturally cooler than the pizza undersurface, moisture will condense on the inner surface of the bottom away from the pizza. By condensing from the steam or hot vapors, the liquid gives its heat up during phase transformation thus adding heat back into the box interior and thus enhancing the heat per unit time retention of the system.

Another aspect of the invention is to provide a pizza box that is round or N-sided and having a single layer of material bottom shaped to form a truncated cone or a truncated N-sided pyramid. Radial grooves, preferably 8 in number, may be formed in the bottom below the surface of the floor serving to strengthen the floor to reduce material content, support the floor above a resting surface through a small thermal conduction area, and to function as knife cutting guides.

Another aspect of the invention is to provide a box of the type described with inner surfaces having heat reflecting capability, such as using white or some other light coloration to reflect radiant energy back from the box inner surface. The generally round shape of the box also tends to concentrate the reflected radiation toward the center of the box for maximum effect.

Another aspect of the invention is to provide a pizza box made from molded fiber material such as molded paper with design elements mentioned herein.

Another aspect of the invention is to provide a pizza box having a top and bottom that are round or N-sided, stackable in the minimum amount of vertical space, needs no pre-assembly folding-from-blank labor, and requires essentially no labor for orienting the top radially with the bottom and no labor for interlocking tabs or locks between top and bottom. In other words, requires the least amount of space, time and labor to store and place the top on to the bottom to form an enclosed chamber. The tops and bottoms may be separate items or hinged together as desired.

Other and further objects, advantages and aspects of the invention will become apparent with the following detailed description of exemplary embodiments thereof when taken in view of the appended drawings, in which:

DRAWINGS

FIGS. 10 and 11 show sectional views of an number of bottoms according to the embodiment of FIG. 1 stacked ready for use.

FIG. 13 is a side—sectional view of the embodiment of FIG. 12.

FIG. 14 is a cross section detail of the hinge portion of the embodiment shown in FIGS. 12 and 13.

DETAILED DESCRIPTION OF EXEMPLARY EMBODIMENTS

Figure 1:
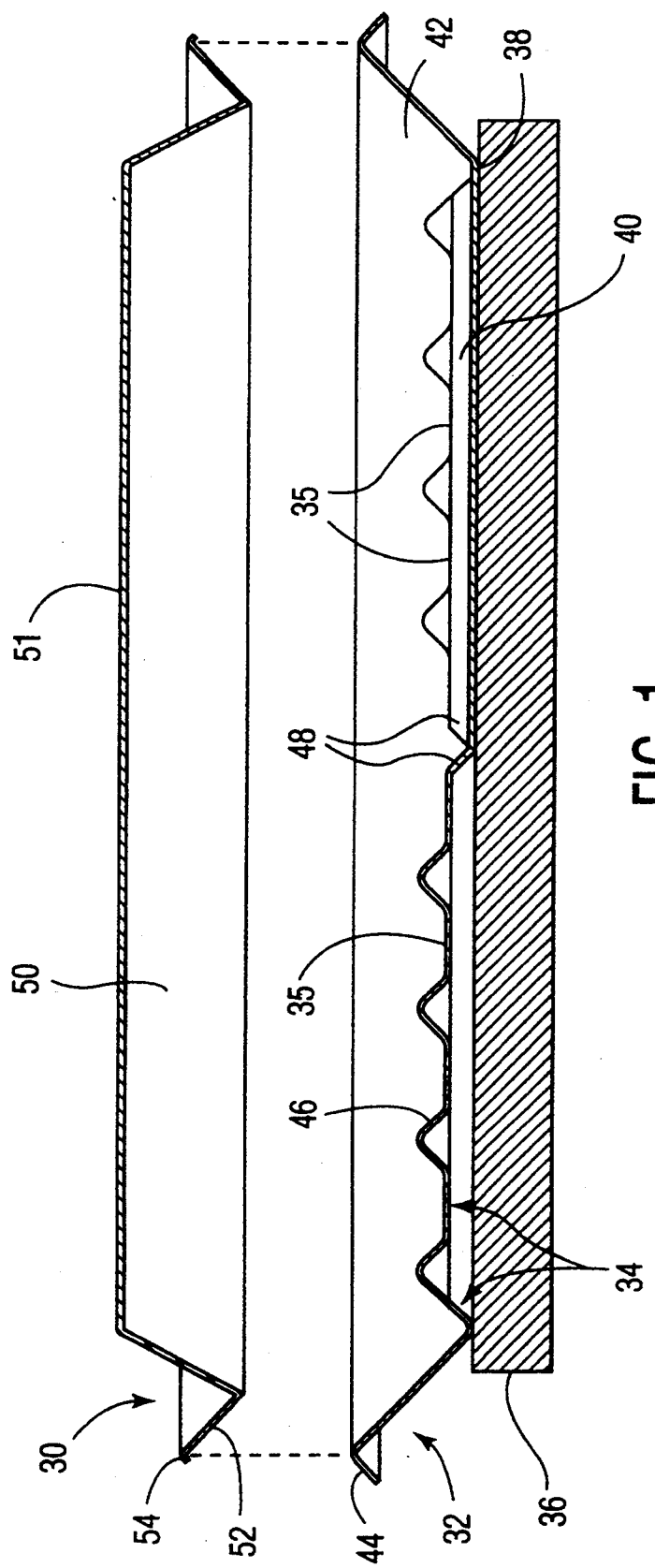
FIG. 1 is a sectional view taken along line 1—1 of FIG. 7 showing one embodiment of the present invention with the top separated and located above the bottom, the latter supported by a resting surface.
Figure 2:
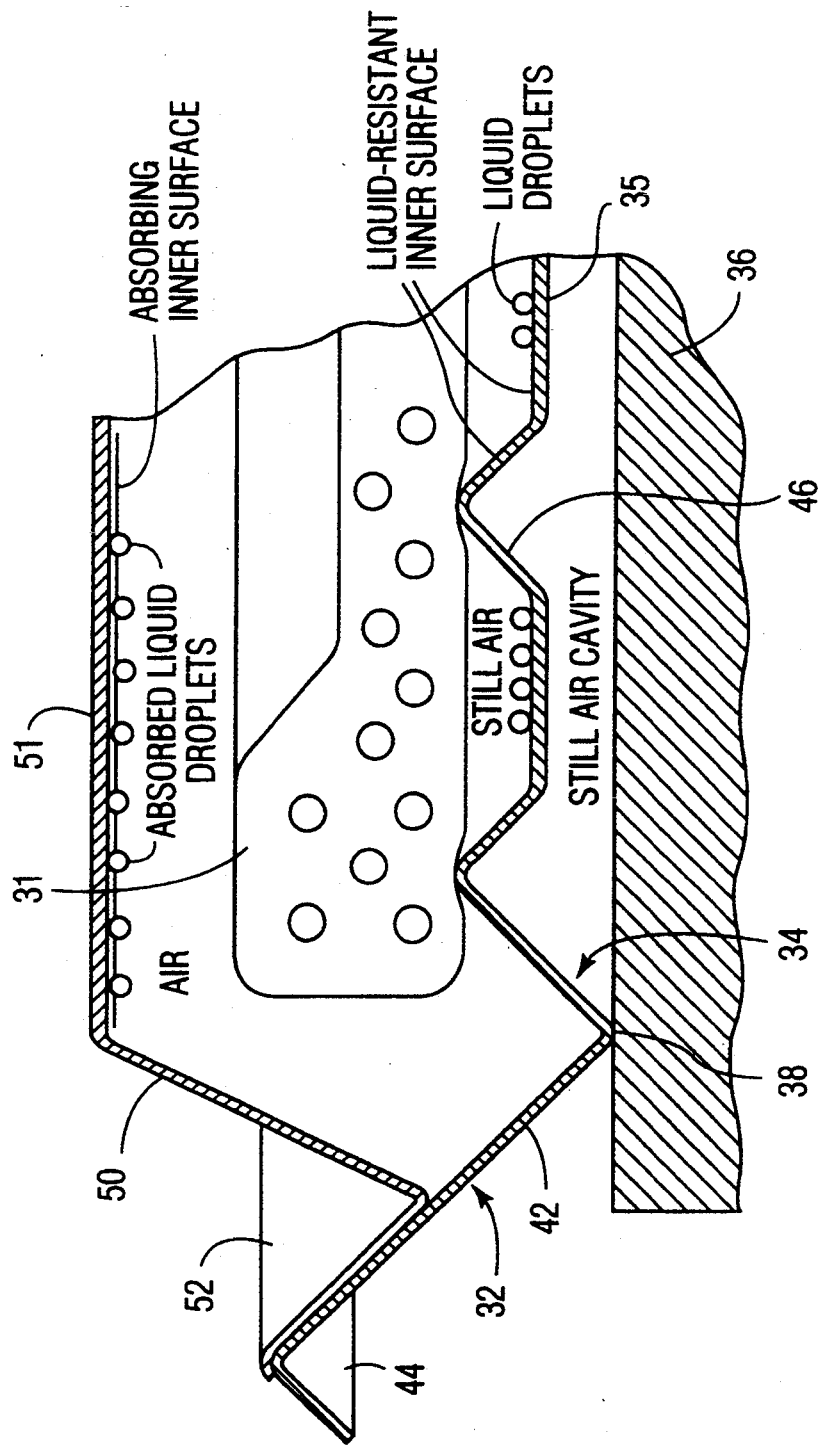
FIG. 2 shows the elements of FIG. 1 assembled into a closed chamber with a hot pizza product stored therein.
Figure 3:
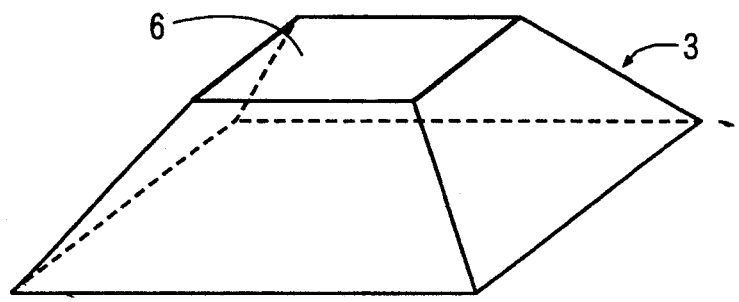
FIGS. 3-6 show perspective views of examples of various upwardly standing projection shapes that may be used in the box bottom of the present invention.
Figure 4:
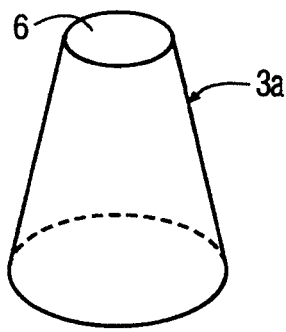
Figure 5:
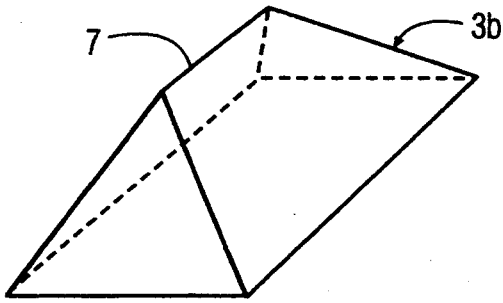
Figure 6:
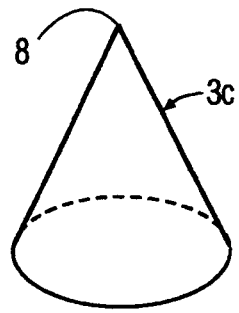
Figure 7:
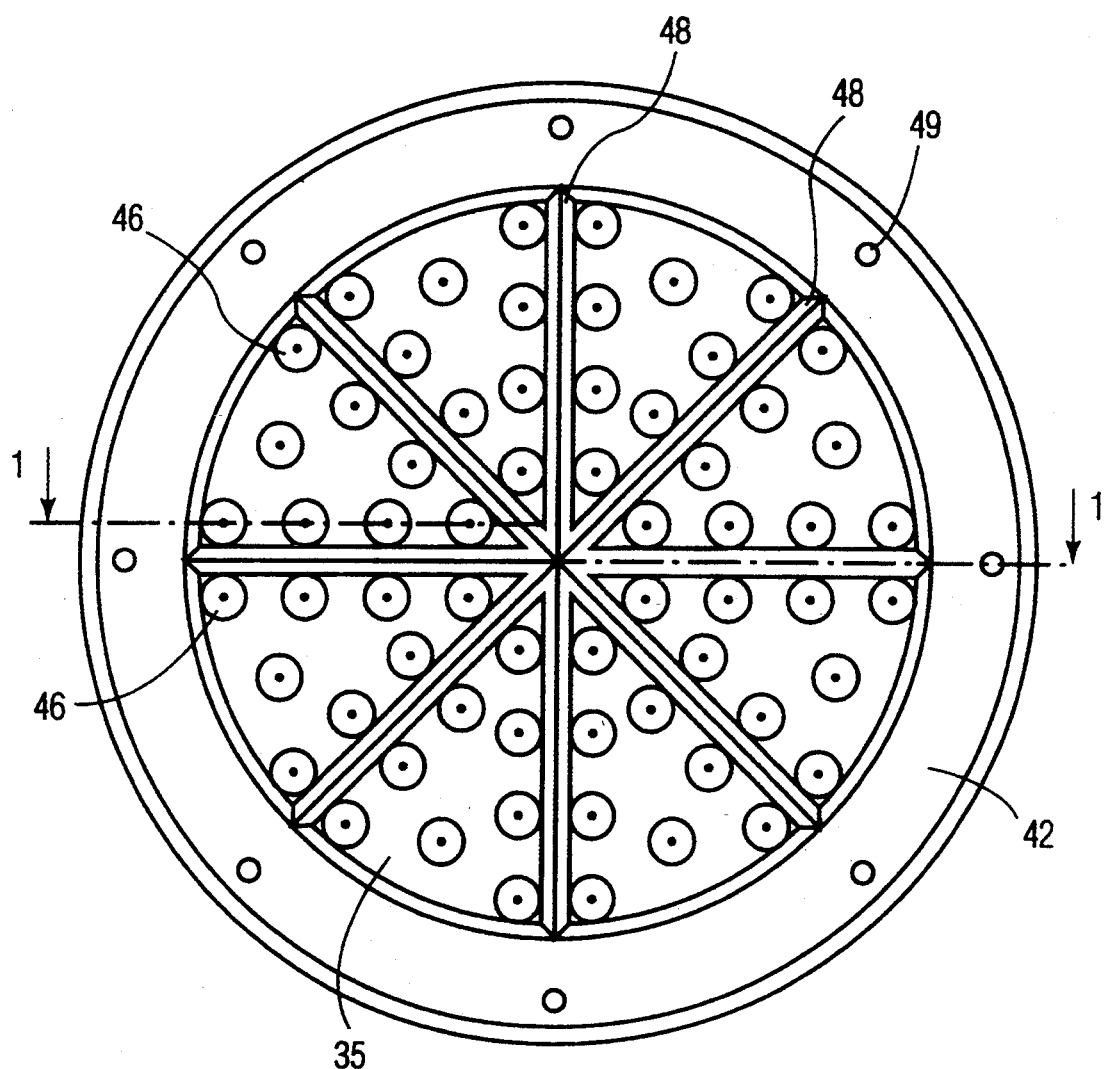
FIG. 7 is a plan view of the bottom of the embodiment of FIG. 1.

With reference to FIGS. 1, 2 and 7, there is shown one example of a pizza box according to the present invention comprising a top 30 and a bottom 32 formed to cooperate as described below to form a closed chamber for supporting, protecting, and insulating a hot pizza product 31.

Bottom 32 comprises a base section 34 formed of a single layer of insulating material having the shape of a truncated cone such that the base periphery of the cone can rest on a resting surface 36 and the top of the truncated cone (ie, the floor 35 of the bottom 32) is supported above the resting surface 36, thus creating a dead-air insulating space 40 beneath the major portion of the base section 32.

The base 34 further comprises upwardly and outwardly extending peripheral side-wall 42 that ends in a downwardly and outwardly extending flange 44.

The base section further includes a number, preferably eight, elongated channels 48 extending downwardly below the floor portion of base 34 and running radially outward from the center of the base section and terminating at the wall of the truncated cone of base section 34. The bottom of the guides can lie in the same plane as the base of the truncated cone. Channels 48 function to strengthen the base in rigidity and provide supporting forces to the floor of base section when on a resting surface, serve as knife guides for cutting the popular 8 equal pieces, and segmenting the still-air or dead-air space below the floor section of base 34 when on a resting surface 36. Because the guides are mostly covered by the product when the box is opened by the user, indicia 49 can be placed or embossed or molded on the side-wall 42 radially in line with the guides to aid the user.

The base section 34 further includes a plurality of upwardly extending relief elements or projections 46 each having an upper end to support the hot pizza product. The combined upper area of all elements 46 is substantially smaller than the area of the horizontal projection of the base section as a whole. As a result, when the pizza product is supported on the tops of elements 46, the heat loss due to conduction through the base section is substantially reduced or insignificant as compared to boxes with flat bottoms having large surface area contact with the hot pizza product. The preferred objective for the selection of the number, shape and positioning of the relief elements 46 is to minimize the total surface area of contact between the elements 46 and the bottom of the hot pizza product which they collectively support and thus the thermal conduction gradient from the pizza product is minimized. The shape of the elements 46 in FIGS. 1 and 2 are cone-like elements with rounded tops. Other suitable shapes of elements can be used such as those shown in FIGS. 3–6. Elements 46 can be truncated pyramid like 3 and truncated-conical 3a and have flat upper, supporting surfaces 6, or ramp-like 3b with a line-like or edge supporting element 7 or cone shaped 3c with point-like tops 8. Combinations of element shapes are possible and the tops of the elements resist the horizontal slippage of the product. Regardless of shape, the elements should have hollow bottoms and be shaped so that they can nest with the corresponding elements of adjacent bottoms when stacked, such as shown in FIGS. 10 and 11.

As shown in FIG. 7 some elements 46 can be arranged so that they form a plurality of pairs of radial rows, each row arranged on opposite sides of each of the eight cutting guide grooves 48 to aid in supporting the product near the cutting location thus aiding in the cutting process for accurate individual pieces. Since the product will cover the cutting guides before the product is cut, score lines, small embossments or some other indicia (not shown) can be placed on the wall 42 radially in line with and to mark the location of the guides 40.

The inner surface of bottom 32 or at least a major portion of the inner surface of the base section can be coated with liquid resistant material or otherwise treated so that the inner surface becomes liquid resistant to prevent the base 34 from absorbing any liquid drippings or condensing liquid. The outer surface of bottom 32 need not be so treated and can remain liquid absorbing if bottom 32 is made of such material.

The top 30 comprises a single layer of insulating material and includes a top section 50 in the shape of a truncated cone, a ceiling 51 and an upwardly-outwardly extending peripheral wall 52 with a downwardly and outwardly extending flange 54 at the periphery thereof. The angles of the relative parts are designed to match the angles of the engaging parts of bottom 32 when the top 30 is placed in closed position with bottom 32. See FIG. 2. The length or radial extent of wall 52 should be sufficiently long so that the surface areas of contact between walls 42 and 52, when engaged, form a seal that prevents the flow of air into or out of the enclosed chamber housing the hot pizza product. Flanges 54 and 44 serve to increase the sealing function, lend strength to the construction, and aid in indexing the parts for rapid placement or lowering into position. The truncated shape of the top also serves to convey supporting forces for the top down through the base which may be necessary if one fully assembled pizza box is stacked on another during transport to the ultimate customer.

Top section 50 can have moisture absorbing means provided on its inner surface for absorbing evaporated moisture or vapors from the pizza product, and thereby prevent the condensation of such moisture from returning to the pizza product and causing quality deterioration of the crisp crust of the product. The moisture absorbing means can be formed as a porous portion or material of the top section 50 or the top section 50 as a whole. Alternatively, a coating of additional material may be applied to the inner surface of section 50 for this function, such as starch or other suitable material. The top or outer surface of ceiling 51 can be made liquid resistant to prevent saturated channels from forming through the ceiling and causing further heat loss.

Top 30 and bottom 32 may be made of any suitable material by any suitable process. However, one preferred material to use is molded paper and a mass production molded paper process that is commonly used today to make paper plates, bowls, and trays. One such common process is practiced to make molded paper products sold nationwide under the Keyes Fibre Company "CHINET" brand. Some of these "CHINET" brand products are made from a single layer of insulating, molded paper treated to form a liquid resistant surface on one side and a liquid absorbing surface on the other. Such arrangement would be suitable for the top and bottom sections of the present invention. Top 30 and bottom 32 should be free of openings so that when assembled the enclosing chamber prevents air flow in and out of the chamber. The inner surfaces of top 30 and bottom 32 should have a white or other suitable light color inner surface to reflect radiant energy back to the interior of the chamber.

As better seen in FIGS. 10 and 11, the top and bottoms of the present invention can nest in the minimum amount of vertical height, IE essentially the thickness of the material for each component, because there is a minimum amount of air spaces between nested corresponding parts of adjacent tops or bottoms, respectively. This is important for shipment, warehousing, storing in the shop storage areas and storing near the oven location. Also, no pre-assembly labor is needed prior to storing in the oven location and the tops and bottoms stand ready for quick assembly into a closed box. Therefore, a particular top or bottom is never handled separately until it is selected for use by the pizza oven operator so it can begin to perform its intended function.

In operation, the operator selects a bottom from the stack of bottoms, places a hot pizza product on to the relief elements 46, withdraws a top from the stack of tops and lowers it in to position as seen in FIG. 2.

Pizza temperature at that time is about 180 Degrees F. Heat transfer occurs inside the closed chamber primarily by convection from the product to the air above and below the product and by radiation to the surrounding surfaces. The generally round shape provides minimum surface area for heat transfer and the light artificial or natural color of the interior provides a reflection coefficient above 0.2 to reflect some energy back toward the hot product. Retained air inside the closed chamber rises. In effect, the air movement is minimized within the chamber which causes a blanket of relatively still warm air to surround the hot product, thus prolonging the heat in the system.

The air below the floor of base section 34 when placed on a resting surface becomes trapped by the peripheral base of the cone-shaped base extending below the floor. Because the surface area contact between the elements 46 and the product and the surface area contact between the base section and the resting surface are very small, heat loss due to conduction is greatly reduced compared to standard boxes. Thus, it can be seen that the present invention provides three layers of functioning thermal insulation (air—solid—air) below the hot product with the use of a single layer of material, ie the material of base section 34 and that losses due to conduction are insignificant.

During delivery and carry-out, the moisture above and below the product evaporates from the product surface. The top inner surface absorbs moisture and prevents it from condensing and dripping back on the product. Moisture does condense on the inner surface of the cooler bottom and yields its phase transition energy back into the system. Thus one gram of water vapor condensing adds back 2.26 kJ to the system. Since the standard popular medium sized pizza dissipates on the average approximately 40 grams of liquid or 90 kJ of its heat energy, the amount of heat given back to the system by the present inventive design is significant.

Because the product is suspended above the base section 34 floor, liquid dripping from the product itself falls away from the product but is allowed to stay on the liquid resistant bottom floor inner surface to keep the base material dry thus preserving the insulating characteristic of the bottom floor and to keep the liquid drops heat content in the system.

Thus, the features of the airtight chamber formed by top 30 and bottom 32 with the top inner surface having moisture absorbing and moisture resistant characteristics and the support of the product above the floor contribute to keeping the product hot and dry and in a fresh, flavorful condition.

Figure 8:
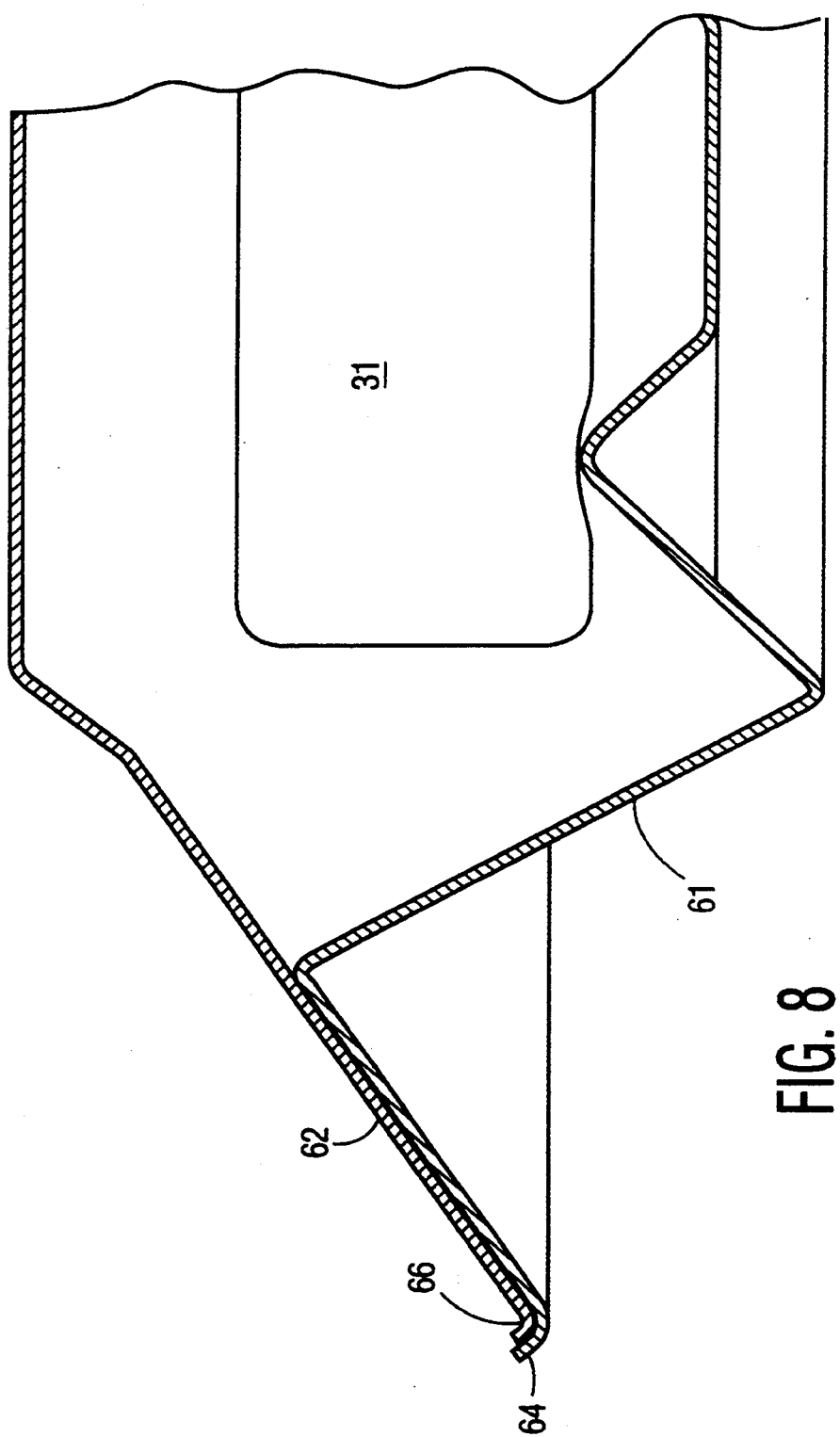
FIG. 8 is a view similar to FIG. 2 showing another embodiment of the engagement between top and bottom.

Referring to FIG. 8 there is shown an alternate design of the bottom and top outer peripheries. In this embodiment, the side wall 61 extends outwardly and upwardly from the base section and has a downwardly and outwardly extending outer wall 60. The top includes a downwardly and outwardly extending wall 62 to engage wall 60 when assembled. Each of these walls can have an upwardly and outwardly extending flange 64 and 66, generally as shown.

Figure 9:
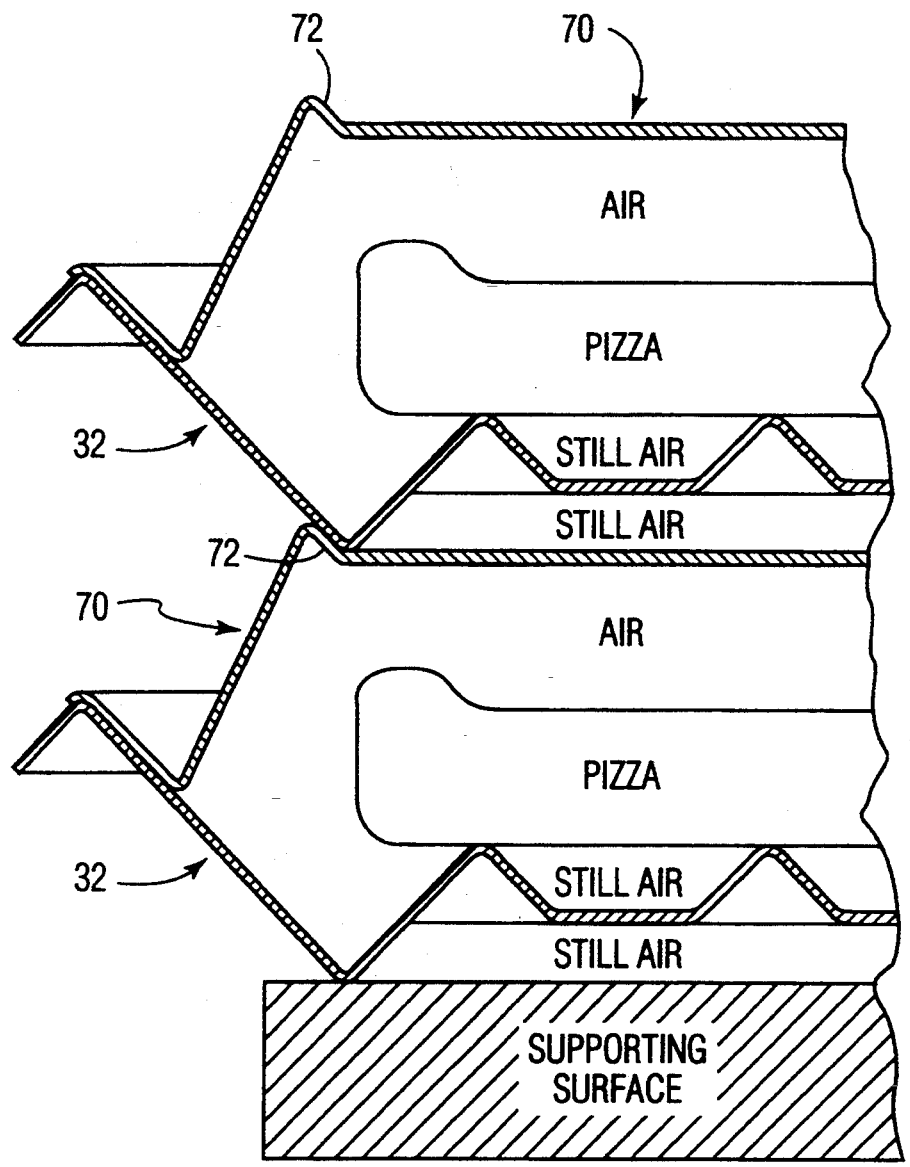
FIG. 9 is similar to FIG. 2 showing another embodiment of the top and two completed boxes stacked for delivery or carry-out.

Referring to FIG. 9, an alternate embodiment for the top is shown. Specifically, top 70 includes an upstanding, hollow, nestable, rim 72 formed at the periphery of the ceiling section. Rim 72 serves to nest with and horizontally retain the bottom of the side wall of bottom 32 when two or more compoleted box are stacked for delivery or carryout.

Figure 12:
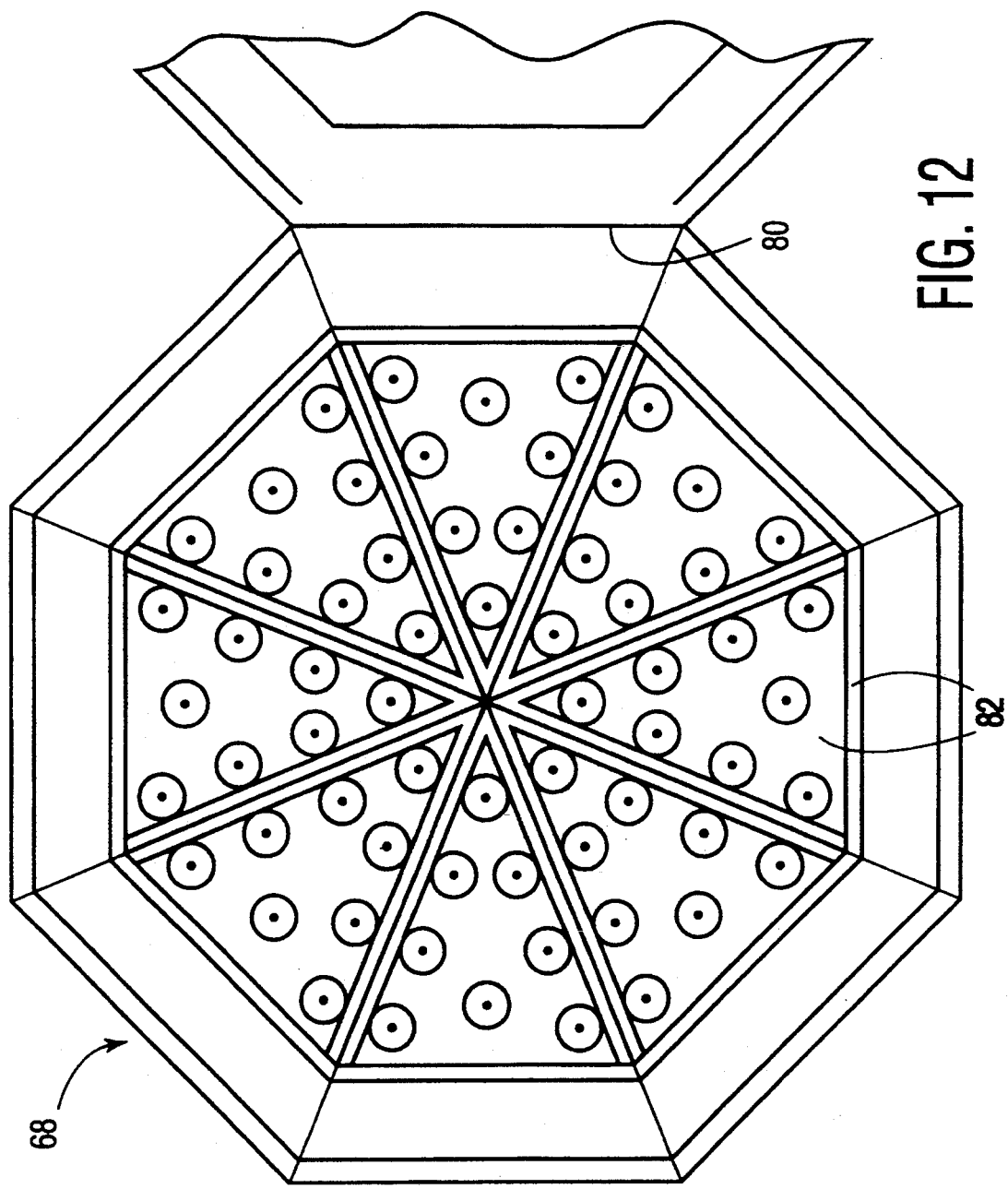
FIG. 12 is a plan view of another embodiment of the present invention.

Referring to FIG. 12, the box according to the present invention may have N -sides where N is greater than four and preferably 6 or greater. It is also preferred that all sides be equal in length. FIG. 12 embodiment of bottom 68 has a base section in the shape of a truncated 8-sided equilateral pyramid 82. Although not entirely shown in this figure, the top also has eight sides and dimensioned to cooperate with the bottom in accordance with the teachings herein.

Tops and bottoms of boxes according to the present invention could be hinged at a point or a line 80 as shown in FIG. 14. The hinged part 80 could be formed thinner than the rest of the box material to facilitate folding. The stackable and nesting benefits of the invention would not be adversely affected by the hinged connection of the top and bottom. Alternatively, the tops and bottoms of this embodiment can be separate elements. In this case, the only difference in assembling the top and bottom would be an insignificant degree of radial orientation of top and bottom.

It will be appreciated that other and further modifications or deletion or relocation of exemplary feature details can be made to the various examples disclosed herein without departing from the teachings, spirit and scope of the present invention.

We claim:

1. A pizza box for storing a hot pizza product and for being supported by a resting surface comprising, A bottom member, a top member for closing upon said bottom to form a chamber for protecting and insulating the hot pizza product, said bottom member having a base section having a floor with an upper surface and an under surface, said base section having a predetermined horizontal projected area, said base section further comprising a plurality of elements extending above said upper surface for supporting the product above said upper surface such that an insulating air-space is formed between a major portion of the bottom of the product and a major portion of said base section below the pizza product when the pizza product is placed thereon, and said base section further comprises a peripheral wall having a base portion extending below said under surface for forming an insulating air-space between a major portion of said base section and a resting surface when the box is placed on such resting surface.

2. A pizza box according to claim 1, wherein the thermal conduction path through said elements is insignificant compared with the thermal conduction path through the major portion of the upper surface.

3. The pizza box according to claim 2, wherein said peripheral wall and said floor form a truncated cone, and wherein the tops of said elements and the base portion of said peripheral wall have a summed total surface area that is small compared to the horizontal projected area of said base section.

4. A pizza box according to claim 3, wherein said peripheral wall, floor and elements are formed of a single layer of insulating material.

5. A pizza box according to claim 3 wherein said top and bottom members are free of openings and engage each other so that they form a closed chamber when the top member is in place on the bottom member.

6. A pizza box according to claim 5 wherein the top member includes an inner surface and a major portion of said top member inner surface having moisture absorbing characteristics.

7. A pizza box according to claim 3 wherein the said upper surface of said floor includes a major floor portion that is liquid resistant.

8. A pizza box according to claim 3 wherein said top and bottom members have inner surfaces and wherein a major portion of said inner surfaces of said top and bottom members have a radiation reflective characteristic.

9. A pizza box according to claim 3, wherein said peripheral wall of the bottom member extends upwardly and outwardly and the said top member comprising an outer wall that extends upwardly and outwardly when in the closed position such that said peripheral wall and outer wall engage one another to support said top member on said bottom member and to form an air restricted engagement therebetween.

10. A pizza box according to claim 9, wherein said peripheral and outer walls have angled peripheral flanges that lie in engagement when said top and bottom members are in the closed position.

11. A pizza box according to claim 3, wherein said peripheral wall of said bottom member extends upwardly and outwardly and then downwardly and outwardly, and said outer wall of said top member extends downwardly and outwardly such that the outer portion of said outer wall engages said downwardly and outwardly extending portion of said peripheral wall to support said top member on the bottom member and to form an air restricted engagement therebetween.

12. A pizza box according to claim 11, wherein said walls have outermost portions and said outermost portions terminate in upwardly and outwardly extending flanges that engage each other when said members are in a closed position.

13. A pizza box according to claim 3, wherein said bottom and top members are each formed of a layer of insulating material and are shaped such that said bottom member is nestable with other like bottom members with no significant air spaces between corresponding parts of said bottom member and adjacent bottom members when nested, and said top member is nestable with other like top members with no significant air spaces between corresponding parts of said top member and adjacent top members when nested.

14. A pizza box according to claim 13, wherein said layer of insulating material is formed of molded paper.

15. A pizza box according to claim 13, wherein said top member is hinged to said bottom member for rotation to close upon said bottom member.

16. A pizza box according to claim 13, wherein said top and bottom members are equilateral octagonal.

17. A pizza box according to claim 13, wherein said top member and bottom member are circular.

18. A pizza box according to claim 3, wherein said base section includes a general center region and wherein channels are formed extending below the upper and under surfaces of said floor and running radially from said general center region of said base section.

19. A pizza box according to claim 18, wherein eight of said channels are provided, equally radially spaced to enable cutting of the product into eight equal pieces when a knife blade moves along said channels.

20. A pizza box according to claim 18, wherein said bottom member includes indicia aligned radially with each said channel to assist a user in locating the channels.

21. A pizza box according to claim 18, wherein said channels have bottoms and said bottoms of at least two of said channels contact the resting surface to provide partial support for said floor section when the box is placed on the resting surface.

22. A pizza box according to claim 1, wherein said top member and bottom member include means for restricting horizontal movement between the top of one said assembled pizza box and the bottom of another said assembled pizza box when two said pizza boxes are stacked for delivery.

23. A pizza box according to claim 1, wherein the height of said top member substantially equals the height of said bottom member.

24. A pizza box according to claim 2, wherein said peripheral wall and said floor form a truncated pyramid, and wherein the tops of said elements and the base portion of said peripheral wall have a summed total surface area that is small compared to the horizontal projected area of said base section.

25. A pizza box for storing a hot pizza product comprising,
a bottom member,
a top member for closing on to said bottom member to form a closed chamber for storing the pizza product,
said bottom member having a base section, said base section having upwardly extending projections, said projections having tops for supporting the product to provide a thermal insulating air space between a major portion of said base section and the bottom of the product when the product is supported by said projections, said base section having a major projection-free portion and said projections forming a plurality of thermal conductivity paths and said projection-free portion forming a conductivity path,
wherein the total of all said thermal conductivity paths through said projections is small compared to said thermal conductivity path through said projection-free portion of the base section.

26. A pizza box according to claim 25, wherein said top and bottom members, when closed, form a closed chamber that prevents the flow of air into and out of the chamber, and said top member having an inner surface that has moisture absorbing characteristics.

27. A pizza box according to claim 26, wherein said bottom member is formed of a single layer of insulating material.

28. A pizza box according to claim 27, wherein said bottom member is round and is shaped to nest with other bottoms so that essentially no air space exists between corresponding parts of adjacent nested bottom members.

29. A pizza box according to claim 27, wherein said bottom member is shaped to form an insulating airspace beneath a major portion of said bottom member and a resting surface when the box is supported on a resting surface.

30. A pizza box according to claim 29, wherein said base section comprises a truncated cone having a predetermined horizontal projected area and having a bottom surface area for contacting a resting surface when placed on a resting surface, and wherein the total summed surface areas of said tops of said projections and said bottom surface area of said truncated cone is small compared to said horizontal projected area.

31. A pizza box according to claim 25, wherein said bottom member comprises an inner surface having a major portion and said major portion of said inner surface of said bottom member comprising liquid resistant characteristics.

32. A pizza box according to claim 25, wherein said top and bottom members having inner surfaces comprising major portions, and said major portions of said inner surfaces of said top and bottom members comprise radiant energy reflecting characteristics.

33. A pizza box according to claim 25, wherein said base section comprises a peripheral wall that extends upwardly and outwardly and said top member comprises an outer wall that extends upwardly and outwardly when in a closed position such that said peripheral and outer walls engage one another to support said top member on said bottom member and to form an air restricted engagement between said walls.

34. A pizza box according to claim 30, wherein said peripheral and outer walls have angled peripheral flanges that lies in engagement when said top and bottom members are in the closed position.

35. A pizza box according to claim 25, wherein said bottom member comprises a peripheral wall that extends upwardly and outwardly and then downwardly and outwardly, and said top member comprises an outer wall that extends downwardly and outwardly such that said outer wall engages said downwardly and outwardly extending peripheral wall to support said top member on said bottom member and to form an air restricted engagement between said peripheral and outer walls.

36. A pizza box according to claim 35, wherein said walls comprise upwardly and outwardly extending peripheral flanges that engage each other when said top and bottom members are in a closed position.

37. A pizza box according to claim 25, wherein said bottom and top members are each formed of a layer of insulating material and are shaped such that said bottom member is nestable with other like bottom members with no significant air spaces between corresponding parts of said bottom and adjacent bottom member when nested, and said top member is nestable with other like top members with no significant air spaces between corresponding parts of said top member and adjacent top member when nested.

38. A pizza box according to claim 37, wherein said layer of insulating material is formed of molded paper.

39. A pizza box according to claim 25, wherein said top member is hinged to said bottom member for rotation to close upon said bottom member.

40. A pizza box according to claim 25, wherein said top and bottom members are equilateral octagonal.

41. A pizza box according to claim 25, wherein said top member and bottom member are circular.

42. A pizza box according to claim 25, wherein said base section comprises an upper surface and an under surface and a generally central zone and wherein channels are formed extending below said upper and under surfaces of said base section and running radially from said central zone of said base section.

43. A pizza box according to claim 42, wherein eight said channels are provided, equally radially spaced to enable cutting of the product into eight equal pieces when a knife blade moves along said channels.

44. A pizza box according to claim 42, wherein said bottom member includes indicia aligned radially with each said channel to assist in locating said channels.

45. A pizza box according to claim 42, wherein said channels have outer bottoms and wherein said bottoms of at least two of said channels contact a resting surface to provide further support to said base section when the box is placed on a resting surface.

46. A pizza box according to claim 25, wherein said top member and bottom member include means for restricting horizontal movement between the top of one said assembled pizza box and the bottom of another said assembled pizza box when two said pizza boxes are stacked for delivery.

47. A pizza box according to claim 27, wherein said bottom member is shaped to form a closed insulating air-space beneath a major portion of said bottom member and a resting surface when the box is supported on a resting surface.

48. A pizza box according to claim 25, wherein the height of said top member substantially equals the height of said bottom member.

49. A pizza box according to claim 27, wherein said bottom member is multisided and is shaped to nest with other bottom members so that essentially no air space exists between corresponding parts of adjacent bottom members when nested.

50. A pizza box according to claim 29, wherein said base section comprises a truncated pyramid having a predetermined horizontal projected area and having a bottom surface area for contacting a resting surface when placed on a resting surface, and wherein the total summed surface areas of said tops of said projections and said bottom surface area of said truncated pyramid is small compared to said horizontal projected area.

51. A pizza box for storing a hot pizza product comprising,
 a bottom member,
 a top member for closing on to said bottom member to form a chamber for storing the pizza product,
 said bottom member having a base section, said base section comprising upwardly extending projections having tops for supporting the product to provide a thermal insulating air space between said base section and the product when the product is supported by said projections, said base section comprising a major projection free portion forming a thermal conductivity path, said projections forming a plurality of conductivity paths, and
 wherein the total of said thermal conductivity path through said projections is small compared to said thermal conductivity path through said projection-free portion of said base section, and
 wherein said base member comprises molded material.

52. A pizza box according to claim 51, wherein said top and bottom members form equilateral eight-sided configurations.

* * * * *